Figure 5:
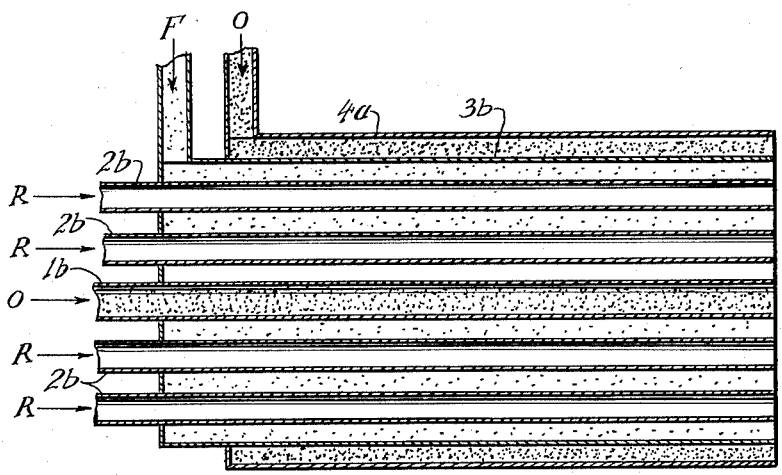

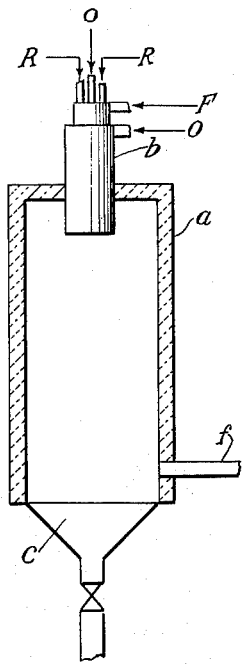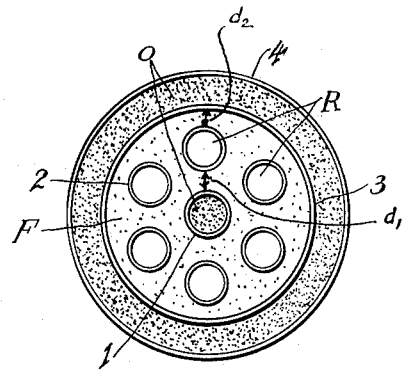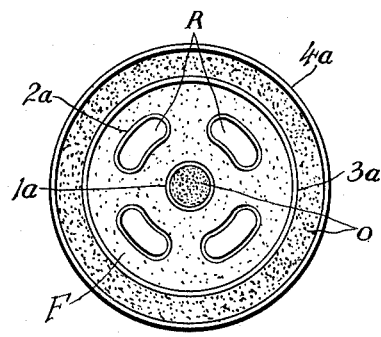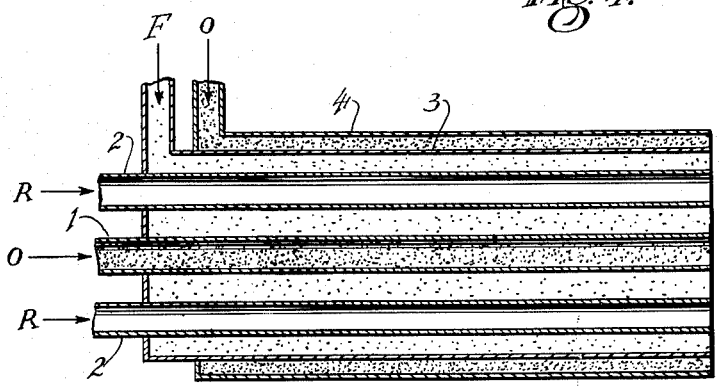

INVENTOR.
Walter Frey
BY Robert Weber
ATTORNEYS

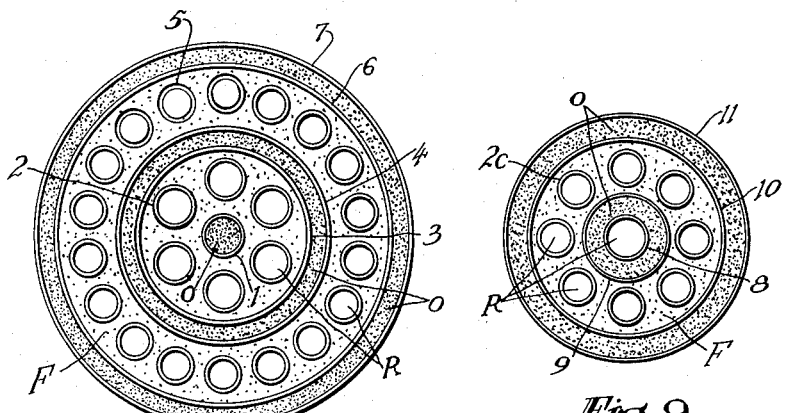
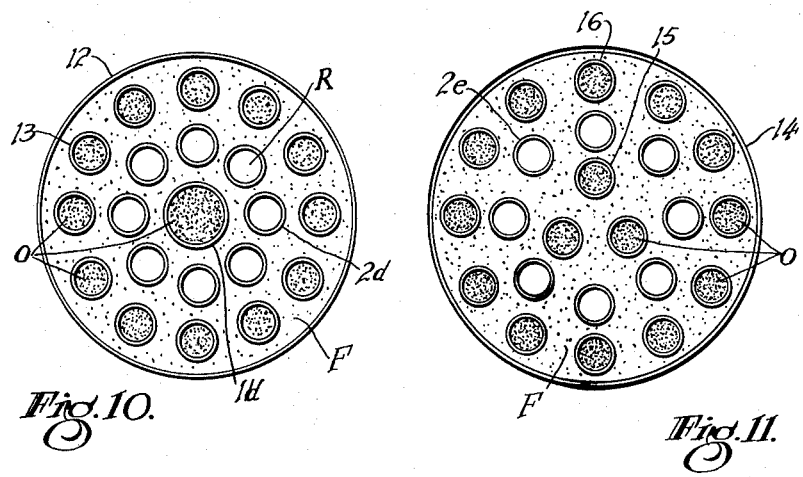

April 21, 1953 R. WEBER ET AL 2,635,946
PROCESS AND APPARATUS FOR THE PRODUCTION OF FINELY
DIVIDED METALLIC OXIDES USEFUL AS PIGMENTS
Filed May 21, 1952 4 Sheets-Sheet 4
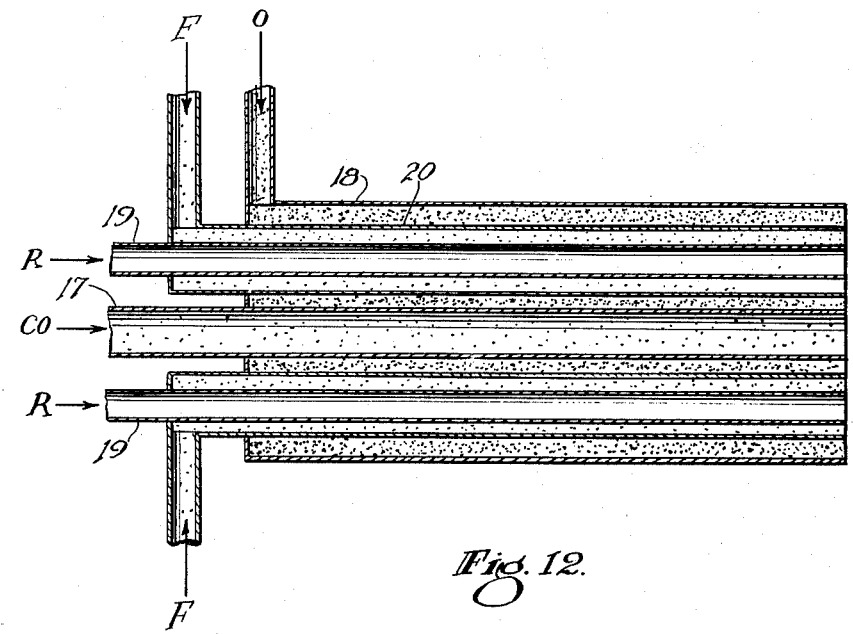
Fig. 12.
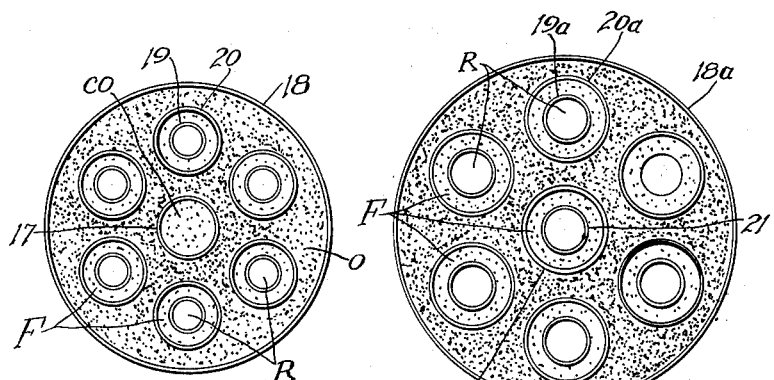
Fig. 13.
Fig. 14.
INVENTOR.
Walter Frey
Robert Weber
BY Pollard H Johnston
ATTORNEYS Patented Apr. 21, 1953

2,635,946

UNITED STATES PATENT OFFICE 2,635,946

PROCESS AND APPARATUS FOR THE PRODUCTION OF FINELY DIVIDED METALLIC OXIDES USEFUL AS PIGMENTS

Robert Weber, Muttenz, and Walter Frey, Basel, Switzerland, assignors to Saeurefabrik Schweizerhall, Schweizerhalle, Switzerland, a corporation of Switzerland Application May 21, 1952, Serial No. 289,147
In Switzerland June 4, 1951

14 Claims. (Cl. 23—140)

The present invention relates to a process and to apparatus for the production of finely divided metallic oxides useful as pigments.

This invention is particularly advantageous for the production of such pigmentary metallic oxides from oxidizable volatile metallic halides, such as titanium tetrachloride, zirconium tetrachloride, ferric chloride, silicon tetrachloride, and the like. It is applicable, in general, to oxidizable metal halides which are volatile in the sense of being sublimable or distillable at temperatures below 500° C.

A copending application Serial No. 75,886, filed February 11, 1949, discloses and claims a basic process for producing finely divided metallic oxides from volatile anhydrous chlorides of metallic elements in groups 3 and 4 of the periodic system, for example, titanium tetrachloride, by supplying continuously into a reaction zone a stream of a gaseous reaction mixture of such a chloride and oxygen containing gas and continuously contacting the reaction mixture in the reaction zone with a flame sustained by a separate inflow of a combustible gas. The reaction mixture stream itself is thus maintained in a flaming state and undergoes an intensive decomposition and oxidation of the metal chloride content to yield a valuable metal oxide of extremely small particle size.

Another copending application Serial No. 158,067, filed April 25, 1950, discloses and claims a modification of the basic process, especially useful for the oxidation of normally solid metal chlorides, such as zirconium chloride, in which the reaction mixture is formed continuously from a streaming suspension of finely divided particles of the metal chloride in the oxygen containing gas provided for its combustion, the chloride particles being vaporized by the heat of the auxiliary flame as the suspension enters the zone where the flaming of the vaporized chloride takes place.

Another copending application Serial No. 187,924, filed October 2, 1950, discloses and claims an improvement of the same process in which a mixture of, for example, titanium tetrachloride and oxygen containing gas is supplied for the flaming oxidation reaction in the form of a thin stream not less than 1 mm. and not more than 1 cm. in thickness, so as to obtain a more selective control of the properties of the titanium dioxide pigments produced by the reaction.

It is a principal object of this invention to provide an improved method and apparatus for carrying out processes of the character disclosed in the applications mentioned hereinbefore, which permit more perfect control of the physical characteristics and enhance the uniformity and value of the metallic oxide pigments.

According to the present invention, it has been found that this object and other objects and advantages can be achieved by continuously supplying into a reaction zone a gaseous reaction mixture of an oxidizable metallic halide and oxygen containing gas, in the form of a plurality of individual small gas streams streaming approximately in the same direction spaced apart and grouped in a pattern defining a closed figure, contacting these small streams with combustible gas flames formed continuously both inside and outside said pattern, and maintaining the internal and external flames in intercommunication through the spaces between the small streams of the reaction mixture.

The individual small gas streams are grouped in a pattern defining a closed figure, within the meaning here intended, if straight lines interconnecting the centers of the several streams and lying in a plane transverse to the stream form a polygon. The inflowing reaction mixture preferably is subdivided into such small gas streams, each having a breadth of only 1 to 10 mm., that these streams may be visualized virtually as spaced parallel lines which are so grouped that the points they would form in a common intersecting plane would define a polygonal pattern.

The practice of this invention entails a distinctive manner of distribution of the inflowing individual streams of the reaction mixture in relation to a separate inflow of at least one auxiliary combustible gas and a separate inflow of at least one auxiliary oxidizing gas which generates flame by reaction with the combustible gas. In general, the inflowing reaction mixture is subdivided into a plurality of individual gas streams as above indicated, while the auxiliary gas of one of said types is brought into the reaction zone around each of these individual gas streams, and the auxiliary gas of the other type is brought into the reaction zone in part outside, and in part inside, the pattern of the individual gas streams.*

The invention will be more fully understood by reference to the accompanying illustrative drawings and the following descritpion. In the drawings, Fig. 1 is a diagrammatic vertical longitudinal section through a reaction chamber suitable for carrying out the invention, in which a suitable burner device appears in elevation.

Figs. 3, 5 and 12 are longitudinal cross sections

---

* Preferably the two auxiliary gases for the auxiliary flames are supplied in about the same direction of flow as the gas streams of the halide mixture.

through three distinct embodiments of burner devices provided for the practice of this invention.

Figure 6:
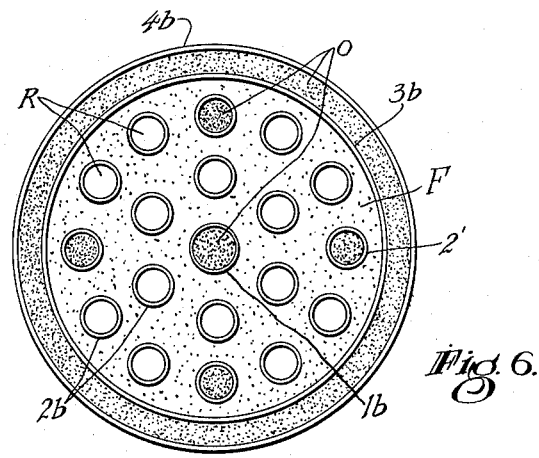

Figs. 2, 6 and 13 are end views of the burner devices of Figs. 3, 5 and 12, respectively, each showing an arrangement of tubes for conducting a gaseous reaction mixture and separate auxiliary gases into a reaction zone.

Figs. 4, 7, 8, 9, 10, 11 and 14, respectively, are similar end views of other forms of burner devices embodying this invention.

The several types of gaseous substances used in the burning process of this invention are designated in the drawings by the letters R, F and O, respectively. R represents a reaction mixture composed of a volatile metal halide and oxygen containing gas to sustain the oxidation of the halide. F represents a combustible or fuel gas, such as CO, $H_2$, methane or the like, which constitutes one of the auxiliary gases of the reaction. The other auxiliary gas is designated by the letter O. In the drawings, heavily stippled areas represent spaces for the flow of an oxidizing gas, lightly stippled areas represent spaces for the flow of a combustible or fuel gas, and unstippled areas represent spaces for the flow of a reaction mixture.

As shown in Fig. 1, the reactions of the metallic halide are carried out in a chamber $a$ which is lined with a refractory material and, if desired, may be heated externally. The reaction chamber $a$ is provided with a gas supply system including a burner $b$ which has a plurality of pipes for the introduction of the several gases into the chamber. The reaction chamber $a$ is also provided with a funnel $c$ for discharging solids precipitated directly from the reaction products, and with an outlet $f$ for taking off a stream of reaction gases which contain finely divided metal oxide and may advantageously be conducted into a dust extracting plant (not shown).

According to the embodiment of Figs. 2 and 3, the burner device is provided with a central tube 1 for introducing an oxygen containing gas O. Tube 1 is surrounded by a plurality of equally spaced tubes 2, each equidistant from tube 1, for the introduction of the reaction mixture R. The centers of the outlets of tubes 2 define a symmetrical ringlike pattern surrounding tube 1. A larger concentric tube 3 surrounds tube 1 and the group of tubes 2, forming an annular conduit between itself and tube 3 for the passage of the combustible gas F into the reaction zone. The axes or centers of the tubes 2 are approximately equidistant from the outer periphery of tube 1 and the inner periphery of tube 3. Finally, a large outermost tube 4 surrounds all the other tubes, in concentric relation to tubes 1 and 3, so as to form an annular passageway for an inflow of oxygen containing gas at O.

The burner arrangement shown in Fig. 4 is similar to that of Figs. 2 and 3, except that the end openings 2a of the several small tubes for introducing the metal halide mixture have an arcuate form and are arranged as spaced segments of a ring.

The burner device shown in Figs. 5 and 6 is provided with three concentric tubes 1b, 3b and 4b which serve functions similar to those of tubes 1, 3 and 4 in Fig. 2. Tubes 1b and 3b, however, are spaced apart at a greater distance than in the case of tubes 1 and 3, and in the free space between them there are two symmetrical ring-like groups of small conduits 2b, one group defining a ring spaced inside the ring defined by the other, for the introduction of the reaction mixture R. Several symmetrically distributed tubes in the outer ring, as indicated at 2', may be used for oxygen containing gas to supplement the principal auxiliary stream of such gas which is introduced in tube 4b.

In the embodiment of Fig. 7, the burner device includes an inner system of gas feeding tubes quite similar to the arrangement of Figs. 2 and 3, together with a concentric outer system which comprises a ring-like pattern of spaced small tubes 5 for feeding the reaction mixture, a surrounding tube 6 for fuel gas and an outermost tube 7 for oxygen containing gas. This device supplies central, outer and intermediate streams of oxygen containing gas through tubes 1, 4 and 7 and intervening annular streams of fuel gas, such as carbon monoxide, through tubes 3 and 6, and many small streams of the reaction mixture are formed in a circular pattern substantially in the middle of each of the annular streams of fuel gas.

Figure 8:
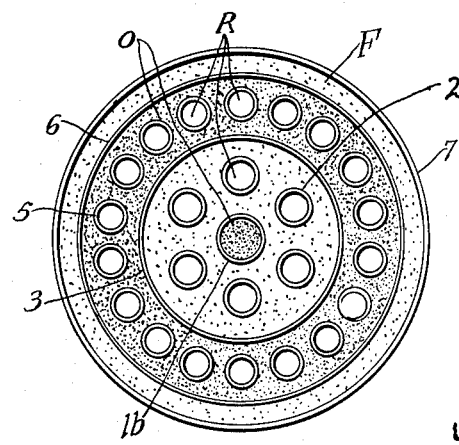

According to Fig. 8, there are two systems of tubes similar in arrangement to the tubes shown in Fig. 7, except that a tube corresponding to tube 4 is omitted. The central tube 1b again serves for an inflow of oxygen containing gas, and ring-like patterns of small tubes 2 and 5 supply the reaction mixture. In Fig. 8, however, oxygen containing gas is introduced through tube 6 and combustible gas is introduced through the outermost tube 7. Although the reaction gas streams of the inner group enter within a combustible gas stream, the reaction gas streams of the outer group enter within an annular stream of oxygen containing gas which is blanketed on both sides by streams of combustible gas.

In the embodiment of Fig. 9, a central tube 8 for the reaction mixture R is surrounded by a concentric tube 9 for oxygen containing gas around which are many individual spaced tubes 2c in a circular pattern for introducing most of the reaction mixture. The small tubes 2c are spaced inside a tube 10 for combustible gas F, and it in turn is spaced inside an outermost tube 11 for oxygen containing gas O.

The burner device shown in Fig. 10 comprises innermost and outermost concentric tubes 1d and 12 for feeding oxygen containing gas and combustible gas, respectively. Two concentric circular groups of spaced small tubes 2d and 13 are located in the annular space between tube 1d and tube 12. The inner group of small tubes supplies the reaction mixture, while the outer group supplies oxygen containing gas.

As shown in Fig. 11, the burner device comprises a single large tube 14 which supplies the combustible gas and surrounds three ring-like groups of equally spaced small tubes. The small tubes 15 of the innermost group supply oxygen containing gas, as do the tubes 16 of the outermost group, while the intermediate group of small tubes 2e serves for the introduction of the reaction mixture.

In the embodiment of Figs. 12 and 13, the reaction mixture R is introduced in small streams through a circularly grouped series of individual tubes 19, each of which is located within a concentric tube 20 which supplies a stream of combustible gas around the reaction mixture. A large tube 18 surrounds all of these pairs of concentric tubes and supplies oxygen containing gas for the auxiliary flame formation. A tube 17 at the center of this burner may introduce a stream of combustible gas to react with the surrounding oxygen containing gas, or a central stream of an inert gas, such as nitrogen, may be supplied by tube 17. Tube 17 is not necessary in this arrangement, since an annular flame will be generated without it, but its use is conducive to a more uniform distribution of the oxygen containing gas.

The embodiment of Fig. 14 is similar to that shown in Figs. 12 and 13, but differs in being adapted for a larger burning capacity and in that the center of the burner assembly is occupied by a pair of concentric tubes 21 and 22 for individual streams of the reaction mixture and the combustible gas, respectively. The other tubes 18a, 19a and 20a in this embodiment correspond in arrangement and function to the tubes 18, 19 and 20 of Fig. 13.

In the construction of burner devices according to any embodiment of this invention, it is advantageous to taper or limit the thickness of the walls of the several tubes at their ends or outlets into the reaction chamber, making them as thin as practicable, so as to obtain a very smooth flow of the gases into the reaction zone. This is especially desirable for the tubes supplying the reaction mixture. For the same reason, it is advantageous to arrange all the tube outlets in approximately the same plane.

The burners can be made of a ceramic material such as vitreous or fused silica, or of glass having a high melting point. On the other hand, they can be made of a metal highly resistant to attack by the gases used, for example, aluminum, and burners constructed of metal have the advantage that they can be formed of several parts and joined together, such as by fitting flanges and screws, so as to be easily dismantled. The outermost tubes of the burners, for example tube 4 of Fig. 3, may be provided with a water or oil jacket to protect it by intensive cooling against the corrosive attack of the very hot halogen containing gases in the reaction chamber.

It will be apparent that the tubes or conduits provided for supplying the auxiliary oxidizing gas, i. e., the tube used for gas O, may be used to supply the combustible gas F if the supply conduits for the latter are used to supply the former.

In all the described embodiments of burner devices for practicing this invention there are separate conduits for supplying, respectively, the reaction mixture, the combustible auxiliary gas and the oxidizing auxiliary gas; the reaction mixture is supplied not merely by one conduit but by a plurality of individual conduits having their outlets spaced apart and grouped in a pattern defining a closed figure; an auxiliary gas of one type is supplied into the reaction chamber by at least one conduit surrounding the individual reaction mixture outlets, and the other type of auxiliary gas is supplied in part inside the pattern of the reaction mixture outlets and in part outside that pattern. Thus, in the process making use of these burner devices, the reaction mixture is subdivided into a multiplicity of individual small streams, and a hot combustible gas flame is maintained both inside and outside the pattern formed by these streams and also in the spaces between the individual reaction mixture streams.

When the process is performed with an apparatus from among the embodiments of Figs. 1 to 11, the auxiliary gas which enters around the individual reaction gas streams reacts both externally and internally with the contacting streams of the second auxiliary gas, thus forming an extended flame zone which is very hot and which encompasses and ignites the individual streams of the metal halide-oxygen mixture so uniformly that the halide undergoes a very fast and uniform reaction.

When the process is performed by use of an apparatus as shown in Figs. 12 to 14, each individual stream of the reaction mixture is surrounded by an individual stream of auxiliary gas which forms an individual flame by reaction with the second auxiliary gas, but these individual flames soon merge so as to form an extended flame zone. Here also the individual streams of the metal halide mixture are rapidly ignited and brought to a uniform reaction.

The ratio of the amount of reaction mixture in peripheral parts of a given reaction mixture inflow to the amount centrally disposed therein depends upon the number of individual streams into which the reaction mixture inflow is subdivided. The larger the number of individual streams, the greater is the peripheral distribution of their gas content. The present invention makes beneficial use of this principle, and according to an important feature of the invention, the reaction mixture streams are kept so small that the distance from their axes or centers to the nearest peripheral part thereof never exceeds a certain maximum. For example, when decomposing $TiCl_4$ vapor and burning CO with $O_2$ for the auxiliary flame, this distance should not exceed about 1 cm. The rate of reaction within this thickness of gas stream appears to be substantially uniform throughout the stream, while if the thickness is greater a decreased rate of reaction apparently occurs and decreases the quality of the product.

Auxiliary flames suitable for the needs of this invention may be provided by reacting combustible gases, such as carbon monoxide, hydrogen, hydrocarbons, and mixtures thereof, with oxygen containing gases. Suitable auxiliary flames may be generated also by the reaction of halogens, preferably chlorine, and hydrogen.

When carbon monoxide and an oxygen containing gas are used for the generation of the auxiliary flame, the separate individual streams of the halide reaction mixture may be introduced either within a stream of carbon monoxide or within a stream of oxygen containing gas. When hydrogen containing combustible gases are used, it is advantageous to introduce the individual streams of the halide reaction mixture within the stream of an oxidizing gas and to subdivide the hydrogen containing gas (e. g. elemental hydrogen, methane or a carbon monoxide-hydrogen mixture) into at least two portions, one of which enters outside the stream of the oxidizing gas and another inside this stream. Various other distributions of the gases may be used, however.

In the description immediately following the conditions of operation of the process of this invention are explained in greater detail, with particular reference to the decomposition of mixtures of titanium tetrachloride and oxygen in contact with auxiliary flames sustained by separate inflows of carbon monoxide and oxygen containing gas. Adaptations of these conditions to the use of other metal halide-oxygen mixtures or of other auxiliary flame gases will be apparent.

For example, when using the apparatus of

Figs. 1 and 2, the titanium chloride-oxygen mixture may be introduced into the reaction zone as many small cylindrical gas streams equidistant from each other and having their axes positioned on a cylindrical surface. The carbon monoxide then is introduced as a ring-like gas layer surrounding the group of individual chloride streams, as well as each of these separate streams. A stream of oxygen is introduced within the center of the ring-like carbon monoxide stream, and another stream of oxygen is introduced around the carbon monoxide stream. Preferably the thickness of the gas streams is so controlled that the distances of the periphery of the two oxygen streams from the periphery of the individual chloride streams are about equal. These distances (e. g. $d_1$ and $d_2$ in Fig. 2) should be not less than about 1 mm. but not more than about 20 mm., and they preferably are between 3 and 12 mm. If the distance is too small, only a very small amount of carbon monoxide will flow out at the more restricted places, and the chloride mixture will obtain too little heat there, with a disadvantageous effect on the quality of the product. The upper limit of this distance has little influence on the quality of the product.

On the other hand, the combustible gas should not be introduced at too great a distance from the chloride mixture, for otherwise its effect will be too much retarded. The total amount of oxygen and its distribution in streams inside and outside the inflow of carbon monoxide are adjusted so that the carbon monoxide will obtain from both oxygen streams about the stoichiometrical amount of oxygen necessary for its complete combustion.

The exit velocities of the gas streams are desirably held within certain limits. The chloride-oxygen mixture is introduced with a velocity between 1 and 50 m./sec., preferably between 5 and 20 m./sec. These velocities are related to the gas volume and to the temperature of the mixture at the burner outlets. If the velocity is too small, the mixture will be ignited immediately at the outlet of the gas conduit and agglomerations will be formed. On the other hand, the reaction proceeds with a certain velocity, within each stream of chloride-oxygen mixture, in a vertical direction from the outside to the center; and it may occur, when using too high exit velocities, that the central portion of such a stream reacts too slowly. This causes the production of metal oxide particles which are not uniform in size.

The exit velocities of the combustible gas and the oxygen containing gas should not exceed the velocity of the combustion of these gases, for otherwise the auxiliary flame may be extinguished. A desirable upper limit for the combustion of pure carbon monoxide lies between 3 and 5 m./sec. for the carbon monoxide stream and between 5 and 10 m./sec. for the oxygen stream. A lower limit is determined by the fact that the streams of auxiliary gases should not form too broad a flame, and in this respect velocities below 0.5 m./sec. are disadvantageous. When hydrogen containing combustible gases are used, the upper limits for the exit velocities are higher and may be twice to four times as high as the desirable upper limit for carbon monoxide.

In order to assure a connection between the inner and outer auxiliary flames, the pattern of individual streams of the chloride mixture may be interrupted by individual streams of the oxygen containing gas; for example, as shown in Fig. 6. In this way, the formation of a flame bridge between the inner and outer flames is facilitated.

For the large scale production of metal oxides, it is advantageous to use several groups of individual reaction gas streams arranged in two or more circular patterns within annular streams of carbon monoxide, as shown in Fig. 7. Preferably, these annular streams of carbon monoxide are separated from each other by a ring-like stream of oxygen, and the outermost gas stream is an annular stream of oxygen. In such an arrangement, starting with the center, oxygen is introduced in the center and is surrounded by an annular stream of carbon monoxide containing a plurality of individual streams of the chloride mixture arranged in a circular pattern within the ring of carbon monoxide. Then follows the first ring of oxygen, then again a ring of carbon monoxide containing individual streams of the chloride mixture, then again an oxygen ring, and so on until the sequence finishes with a ring of oxygen.

In order to assure ignition of the chloride mixture with a fast reaction and production of uniform particles, it is necessary that the chloride mixture contain sufficient oxygen, preferably at least the theoretical amount of oxygen and advantageously a surplus of, for example, 20 to 200%. If part of the oxygen for the decomposition of the chloride is supplied to the reaction zone as part of a separate oxygen containing gas stream, the chloride mixture may contain less than the theoretical amount of oxygen. Under such circumstances, the metal halide does not react to completion. However, a sufficient quantity of seeds of about equal size is formed upon which the unreacted metal halide subsequently reacts with the separately supplied oxygen, with the formation of approximately uniform particles. The chloride-oxygen mixture, however, should contain at least 50% of the theoretical amount of oxygen. The oxygen which is needed for completion of the reaction is supplied advantageously with the oxygen necessary for the combustion of the combustible gas. The grain size may be controlled by the distribution of the oxygen. An excess of oxygen in the reaction mixture generates a finer particle size and a deficiency of such oxygen causes an increased size.

The particle size may be controlled also by the admixture of inert gases, e. g. nitrogen, carbon dioxide, etc., with the metal chloride-oxygen mixture. Such a dilution of the mixture may induce the formation of fine oxide particles. When it is desired to decompose a strongly diluted reaction mixture, a mixture of metal halide vapor and air may be used. A strong dilution of the reaction mixture, however, complicates the chlorine recovery, and it has been found that the influence of the inert gas decreases with its increasing concentration in the chloride mixture. The optimum effect of dilution is to be found in the range of pure oxygen to 50% oxygen.

The amount of combustible gas in relation to metal halide vapor of course has an important influence on the temperature of the flame and therefore on the temperature ambient to the flame (e. g. within a distance of 1–10 cm. from the outer auxiliary flame). A minimum amount of combustible gas is necessary in order to reach the reaction temperature needed. For relatively low reaction temperatures, 0.25 to 0.5 vol. of combustible gas (e. g. CO) suffice for the decomposition of one volume of metal halide vapor. For higher temperatures larger amounts are necessary, e. g. 1 to 2 vol. Still higher amounts of combustible gases increase the reaction temperatures only to a small degree. If more than 5 vol. are used, the increase in temperature is negligible.

The temperature ambient to the flame has an influence on the particle size and the crystal structure. For instance, the rutile concentration of $TiO_2$ is controlled to a certain degree by this temperature. Temperatures from about 700 to 800° C. favor the formation of $TiO_2$ with a high concentration of anatase (90% and more), and temperatures of 1200° C. and more favor the fomation of $TiO_2$ with a high rutile concentration (80% and more).

It is important in the practice of this invention that the mixture of the metal halide with the oxygen containing gas be as homogeneous as possible. Such a mixture may be produced by bubbling oxygen containing gas through a liquid metal halide. However, the metal halide may be vaporized first or reduced to a very fine suspension and then mixed with an oxygen containing gas.

In order to keep the halide mixture homogeneous, it should be introduced into the reaction zone at a temperature above the dew point of the metal halide. For this purpose, after the preparation of the reaction mixture, it may be heated to a temperature sufficiently above the condensation point of its metal halide content to prevent deposition of the metal halide in the burner conduits during the flow of the reaction mixture to the reaction chamber. The degree of this preheating is limited by the temperature at which the reaction mixture begins to react. Most of the volatile metal halides start to react with oxygen at temperatures near 500° C. or somewhat lower temperatures.

The following examples further illustrate the practice of this invention.

Example 1

A reaction chamber as diagrammed in Fig. 1 and a burner as shown in Figs. 2 and 3 are used here, the reaction chamber having an inside diameter of 20 cm. and a length of 1 meter. Concentric burner tubes 1, 3 and 4 have inside diameters of 6 mm., 32 mm. and 36 mm., respectively. These six small tubes 2 each has an inside diameter of 6 mm. All tubes are made of aluminum and have a wall thickness of about 1 mm., but their ends are tapered to very thin edges so that the wall thickness at the gas outlets is less than 0.1 mm.

The gases are introduced into the reaction chamber at a temperature of about 150° C., in the following quantities per minute:

(a) Through tube 1, 2.5 liters of $O_2$ having a moisture content of about 0.2%;

(b) Through tube 4, 6.5 liters of $O_2$ having a moisture content of about 0.2%;

(c) Through tube 3, 18 liters of pure CO having a moisture content of less than 0.01% of water vapor; and (d) Through the small tubes 2, a vaporous retion mixture consisting of 18 liters of $TiCl_4$, 0.18 liter of $AlCl_3$, 0.1 liter of $SiCl_4$, 25 liters of $O_2$, and 25 liters of $N_2$.

The process is initiated by first starting the inflows of $O_2$ and CO and igniting them to a flame and then starting the reaction mixture inflow. The carbon monoxide flame is kept burning continuously, and the reaction mixture flows continuously into contact with this enveloping flame which burns outside and inside the pattern of small reaction mixture streams and also burns in the spaces between these streams. Thus the individual streams of the chloride mixture are ignited evenly by the contacting flame of CO and $O_2$, and the mixture very rapidly reacts to completion. The temperature ambient to the flame is kept at about 1200° C. The products of the reaction contain more than a 95% yield of pigmentary $TiO_2$ which is more than 95% rutile and shows a tinting strength in excess of 1600.

Example 2

In this example a reaction chamber like that of Fig. 1, having a diameter of 70 cm. and a length of 250 cm., was used with a burner of the type shown in Fig. 7. The central burner tube 1 and concentric tube 3 had inside diameters of 10 mm. and 40 mm., respectively. The six symmetrically arranged tubes 2 in the annular space between tube 1 and tube 3 had inside diameters of 10 mm. The inside diameters of tube 4 and concentric tube 6 were 50 mm. and 80 mm., respectively. The eighteen tubes 5 in the annular space between tube 4 and tube 6 had inside diameters of 9 mm., and the diameter of the outermost tube 7 was 95 mm.

The gases were discharged into the reaction chamber at a temperature of about 100° C., in the following quantities per minute:

(a) Through tube 1, 40 liters of $O_2$, between tube 3 and tube 4, 190 liters of $O_2$, and between tube 6 and tube 7, 210 liters of $O_2$. The oxygen supply contained about 0.3% of water vapor.

(b) Through the space between tube 1 and tube 3, 130 liters of CO, and through the space between tube 4 and tube 6, 300 liters of CO. The supply of carbon monoxide contained less than 0.1% of water vapor.

(c) Having started the inflows of CO and $O_2$ and ignited the CO, a reaction mixture of $SiCl_4$ vapor with oxygen and nitrogen was supplied through the many small tubes 2 and 5. The inflow per minute through tubes 2 consisted of 160 liters of $SiCl_4$, 130 liters of $N_2$, and 130 liters of $O_2$, and the inflow per minute through tubes 5 consisted of 400 liters of $SiCl_4$, 300 liters of $N_2$ and 300 liters of $O_2$. In this operation, the temperature ambient to the flame was kept at about 1000° C. The product obtained was an extremely fine $SiO_2$ having a bulk weight of about 0.01 gr./cm.$^3$, and well suited for use as a filler in rubber compounds.

Example 3

A reaction chamber as indicated in Fig. 1 was used with a burner of the type shown in Fig. 10, this reaction chamber having a diameter of 35 cm. and a length of 1.5 mm. The burner tube diameters were: central tube 1d, 14 mm.; outermost tube 12, 80 mm.; eight small tubes 2d, 10 mm. each; twelve small tubes 13, 11 mm. each. The small tubes 2d were spaced at a distance of 4 mm. from tube 1d, and the small tubes 13 were spaced at a distance of 4 mm. from tube 12.

The gases were introduced into the reaction chamber at a temperature of about 200° C., in the following quantities per minute:

(a) Through tube 1d, 18 liters of $O_2$, and through the twelve tubes 13, 72 liters of $O_2$; the oxygen supply for all these tubes having a moisture content of about 0.5%;

(b) Through tubes 2d a reaction mixture consisting of 100 liters of AlCl₃ and 140 liters of O₂; and (c) Through the annular space between tube 1d and tube 12, 180 liters of CO containing less than about 0.05% of water vapor.

The gases were ignited and maintained in a flaming condition in the same manner as described in the preceding examples. The temperature ambient to the flame was kept at about 1100° C. A very fine Al₂O₃ was produced.

*Example 4*

The same reaction chamber was utilized as in Example 3, but with a burner of the type shown in Fig. 13. The outlets of the burner tubes had the following diameters:

|  | mm. |
|---|---|
| Central tube 17 | 15 |
| Six tubes 19 each | 10 |
| Six tubes 20 each | 16 |
| Outermost tube 18 | 64 |

The gases were fed into the reaction chamber in the following quantities per minute:

(a) Through the annular space between tube 17 and tube 18, 90 liters of H₂;

(b) Through the six tubes 19, a mixture of 85 liters of TiCl₄ vapor, 85 liters of N₂ and 130 liters of O₂, at a temperature of about 120° C.; and (c) Through the six annular spaces between tubes 19 and tubes 20, and through tube 17, a mixture of 82 liters of Cl₂ and 8 liters of O₂, containing less than 0.01% of water vapor.

In initiating the process, the H₂ and Cl₂ were first ignited to a flame, and the reaction mixture was then fed into the flame. The temperature ambient to the flame was about 1100° C. A pigmentary TiO₂ having a tinting strength of about 1400 was produced.

*Example 5*

The same reaction chamber was utilized in this example as in Example 3, but the burner was of the type shown in Fig. 14. The burner tubes had the following diameters:

|  | mm. |
|---|---|
| Outermost tube 18a | 66 |
| Tube 21 and six tubes 19a each | 10 |
| Tube 22 and six tubes 20a each | 18 |

The gases were fed into the reaction chamber in the following quantities per minute:

(a) Through tube 21 and six tubes 19a, a mixture of 75 liters of TiCl₄ vapor, 3.5 liters of SiCl₄ vapor, 150 liters of N₂ and 105 liters of O₂, at a temperature of about 150° C.;

(b) Through the seven annular spaces between six tubes 20a and 19a and between central tubes 21 and 22, a mixture of 50 liters of CO and 50 liters of N₂, containing less than 0.01% of water vapor;

(c) Through the anular space between tube 18a and tube 22, a mixture of 25 liters of O₂ and 25 liters of N₂, containing about 0.25% of water vapor.

In initiating the process, the CO and O₂ were ignited to a flame and the individual streams of the reaction mixture were injected into the flame. The temperature ambient to the flame was about 750° C. A TiO₂ containing about 90% of anatase and having a tinting strength of about 1300 was obtained.

The tinting strengths of the TiO₂ products mentioned in the examples were determined by standard methods of the National Lead Co., as described in Gardiner, Physical and Chemical Examination of Paints, Varnishes, Lacquers and Colors, 10th Edition (1946), at page 44. Numerical values are based upon a scale according to which commercial rutile produced by the well known sulfate process shows a tinting strength of about 1500, while commercial anatase so produced shows a tinting strength of about 1200.

The practice of this invention has been exemplified herein by various details and illustrative embodiments. It will be understood, however, that the details may be varied widely and that substitutions, additions or omissions may be made without departing from the scope or spirit of the invention which is intended to be defined by the appended claims.

What is claimed is:

1. In a process for producing a pigmentary metallic oxide from an oxidizable volatile metallic halide, which comprises continuously flowing into a reaction zone a gaseous reaction mixture of such halide and oxygen containing gas, flowing separately thereto at least one auxiliary combustible gas and at least one auxiliary oxidizing gas, reacting together these two types of auxiliary gases to maintain an auxiliary flame in said zone, and burning said mixture in contact with said auxiliary flame: subdividing the inflowing reaction mixture into a plurality of individual streams spaced apart and grouped in a pattern defining a closed figure, flowing auxiliary gas of one of said types into said zone around each of said individual streams, and flowing the auxiliary gas of the other of said types into said zone in part outside said pattern of individual streams and in part inside said pattern.

2. In a process for producing a pigmentary metallic oxide from an oxidizable volatile metallic halide, which comprises continuously flowing into a reaction zone a reaction mixture of such halide and oxygen containing gas, flowing separately thereinto at least one auxiliary combustible gas and at least one auxiliary oxidizing gas, reacting together these two types of auxiliary gases to maintain an auxiliary flame in said zone, and burning said mixture in contact with said auxiliary flame: subdividing the inflowing reaction mixture into a plurality of individual streams spaced apart and grouped in a pattern defining a closed figure, flowing auxiliary combustible gas into said zone around each of said individual streams, and flowing the auxiliary oxidizing gas into said zone in part around said pattern of individual streams and in part inside said pattern.

3. A process for producing a pigmentary metallic oxide from a gaseous reaction mixture of an oxidizable volatile metallic halide and oxygen containing gas, which comprises continuously supplying said mixture into a reaction zone in a plurality of individual small streams spaced apart and grouped in a pattern defining a closed figure, contacting said streams in said zone with a combustible gas flame formed continuously inside said pattern and a combustible gas flame formed continuously outside said pattern, and maintaining said flames in intercommunication through the spaces between said streams.

4. In a process for producing a pigmentary metallic oxide from an oxidizable volatile metallic halide, which comprises continuously flowing into a reaction zone a gaseous reaction mixture of such halide and oxygen containing gas, flowing separately thereinto at least one auxiliary combustible gas and at least one auxiliary oxidizing gas, reacting together these two types of auxiliary gases to maintain an auxiliary flame in said zone, and burning said mixture in contact with said auxiliary flame: subdividing the inflowing reaction mixture into a plurality of individual streams spaced apart and grouped in a symmetrical pattern defining a closed figure, flowing auxiliary gas of one of said types into said zone around each of said individual streams, and flowing the auxiliary gas of the other of said types into said zone in part outside said pattern of individual streams and in part inside said pattern.

5. In a process for producing a pigmentary metallic oxide from an oxidizable volatile metallic halide, which comprises continuously flowing into a reaction zone a gaseous reaction mixture of such halide and oxygen containing gas, flowing separately thereinto at least one auxiliary oxidizing gas, reacting together these two types of auxiliary gases to maintain an auxiliary flame in said zone, and burning said mixture in contact with said auxiliary flame: subdividing the inflowing reaction mixture into a plurality of individual streams spaced apart approximately equidistant from each other and grouped in a symmetrical pattern defining a closed figure, flowing auxiliary gas of one of said types into said zone around each of said individual streams, and flowing the auxiliary gas of the other of said types into said zone in part outside said pattern of individual streams and in part inside said pattern.

6. In a process for producing a pigmentary metallic oxide from an oxidizable volatile metallic halide, which comprises continuously flowing into a reaction zone a gaseous reaction mixture of such halide and oxygen containing gas, flowing separately thereinto at least one auxiliary combustible gas and at least one auxiliary oxidizing gas, reacting together these two types of auxiliary gases to maintain an auxiliary flame in said zone, and burning said mixture in contact with said auxiliary flame: subdividing the inflowing reaction mixture into a plurality of individual streams spaced apart and grouped in a pattern defining a closed figure, flowing auxiliary gas of one of said types into said zone around each of said individual streams, and flowing the auxiliary gas of the other of said types into said zone in part outside said pattern of individual streams and in part inside said pattern, the gas inflows outside and inside said pattern being each spaced from said individual streams a distance of 3 to 12 mm. and said individual streams having a breadth of 1 to 20 mm. in the direction of these distances.

7. In a process for producing a pigmentary metallic oxide from an oxidizable volatile metallic halide, which comprises continuously flowing into a reaction zone a gaseous reaction mixture of such halide and oxygen containing gas, flowing separately thereinto at least one auxiliary combustible gas and at least one auxiliary oxidizing gas, reacting together these two types of auxiliary gases to maintain an auxiliary flame in said zone, and burning said mixture in contact with said auxiliary flame: subdividing the inflowing reaction mixture into a plurality of individual streams spaced apart and grouped in a pattern defining a closed figure, flowing auxiliary gas of one of said types into said zone around each of said individual streams, and flowing the auxiliary gas of the other of said types into said zone in part outside said pattern of individual streams and in part inside said pattern, said individual streams being introduced at a velocity of 5 to 20 meters per second and said auxiliary gases each being introduced at a velocity of about 1 to 4 meters per second.

8. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: a plurality of individual fluid conduits for subdividing the inflowing reaction mixture into a plurality of individual streams and having their outlets spaced apart and grouped in a pattern defining a closed figure, at least one conduit for flowing auxiliary gas of one of said types into said chamber in surrounding relation to said individual conduit outlets, and at least one conduit for flowing auxiliary gas of the other of said types into said chamber in part outside said pattern of outlets and in part inside said pattern.

9. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: a plurality of individual fluid conduits for subdividing the inflowing reaction mixture into a plurality of individual streams and having their outlets spaced apart and grouped in a symmetrical pattern defining a closed figure, at least one conduit for flowing auxiliary gas of one of said types into said chamber in surrounding relation to said individual conduit outlets, and at least one conduit for flowing auxiliary gas of the other of said types into said chamber in part outside said pattern of outlets and in part inside said pattern.

10. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: a plurality of individual fluid conduits for subdividing the inflowing reaction mixture into a plurality of individual streams and spaced apart approximately equidistant from each other and grouped in a symmetrical pattern defining a closed figure, at least one conduit for flowing auxiliary gas of one of said types into said chamber in surrounding relation to said individual conduit outlets, and at least one conduit for flowing auxiliary gas of the other of said types into said chamber in part outside said pattern of outlets and in part inside said pattern.

11. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: an outermost fluid conduit for flowing auxiliary gas of one of said types into said chamber, its outlet defining the external outline of the several gas inflows, a plurality of individual fluid conduits for flowing said mixture into the chamber having their outlets spaced apart in a pattern defining a closed figure and spaced inwardly from the outermost conduit outlet, and at least one distinct fluid conduit for flowing auxiliary gas of the other of said types into said chamber having gas outlet elements in spaced relation to the outermost conduit outlet and to said individual conduit outlets and lying partly inside and partly outside said pattern.

12. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: an outermost fluid conduit for flowing auxiliary gas of one of said types into said chamber, its outlet defining the external outline of the several gas inflows, a plurality of individual fluid conduits for flowing said mixture into the chamber having their outlets spaced apart in a pattern defining a closed figure and spaced inwardly from the outermost conduit outlet, and at least one distinct fluid conduit for flowing auxiliary gas of the other of said types into said chamber including a tube opening in inwardly spaced relation to the outermost conduit outlet and surrounding said individual conduit outlets in spaced relation thereto, and at least one other tube opening inside said pattern in spaced relation to said individual conduit outlets.

13. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: an outermost fluid conduit for flowing auxiliary gas of one of said types into said chamber, its outlet defining the external outline of the several gas inflows, a plurality of individual fluid conduits for flowing said mixture into the chamber having their outlets spaced apart in a pattern defining a closed figure and spaced inwardly from the outermost conduit outlet, and a plurality of distinct fluid conduits for flowing auxiliary gas of the other of said types into said chamber including a plurality of spaced tubes opening in inwardly spaced relation to the outermost conduit outlet and disposed in a pattern around the aforesaid pattern and at least one tube opening inside said aforesaid pattern in spaced relation to the individual conduit outlets.

14. In an apparatus for producing a pigmentary metallic oxide from an oxidizable volatile metallic halide, comprising a reaction chamber, means for flowing into said chamber a reaction mixture of such halide and oxygen containing gas, and means for flowing separately thereinto at least one auxiliary combustible gas and at least one auxiliary oxidizing gas so as to react together these two types of auxiliary gases and maintain an auxiliary flame in said chamber: an outermost fluid conduit for flowing auxiliary gas of one of said types into said chamber, its outlet defining the external outline of the several gas inflows, a plurality of individual fluid conduits for flowing said mixture into the chamber having their outlets spaced apart in a pattern defining a closed figure and spaced inwardly from the outermost conduit outlet, and a plurality of distinct fluid conduits for flowing auxiliary gas of the other of said types into said chamber including an individual tube opening around each of said individual conduit outlets in spaced relation to the same and to the outermost conduit outlets.

ROBERT WEBER.
WALTER FREY.

No references cited.